Patented Aug. 23, 1932

1,873,848

UNITED STATES PATENT OFFICE

WILLIAM HENRY MOSS AND BLANCHE BABETTE WHITE, OF CUMBERLAND, MARYLAND, ASSIGNORS TO CELANESE CORPORATION OF AMERICA, A CORPORATION OF DELAWARE

SYNTHETIC RESIN AND METHOD OF MAKING THE SAME

No Drawing. Application filed November 17, 1928. Serial No. 320,209.

This invention relates to the preparation of a synthetic resin from toluene sulfonamid, and also to coating or plastic compositions containing derivatives of cellulose, and particularly organic derivatives of cellulose.

An object of our invention is to prepare a synthetic resin that is compatible with derivatives of cellulose, and therefore suitable for use in films, lacquers or other coating compositions or plastics containing such derivatives of cellulose.

A further object of our invention is to provide a suitable resin for lacquers or plastic compositions containing organic substitution products of cellulose such as cellulose acetate, which resin is compatible with the other constituents of the lacquers and which produces clear solutions which, upon drying, form films that are adherent, tough, hard and water repellant.

The preparation of a lacquer containing organic derivatives of cellulose such as cellulose acetate as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

We have found that the synthetic resins produced from toluene sulfonamid and toluene sulfonamid-formaldehyde resin are compatible with cellulose acetate, and that when added to lacquers containing cellulose acetate they form clear solutions that, upon drying, produce clear, hard, tough and firmly adherent films.

The selection of a suitable resin for a lacquer containing the organic derivatives of cellulose presents a difficult problem because the resin must be compatible with the organic derivatives such as cellulose acetate, both in solution and in the dry films, and also with softeners, pigments, dyes which may be added to produce desired effects and variations of the films. In general, a synthetic resin for this purpose should be easily prepared from preferably cheap materials, it should be free of or easily freed from catalysts, either acid or alkaline, used in its preparation, it should of itself be practically neutral and should be strongly resistant to water and free from water soluble materials.

We have found that the special resins prepared from toluene sulfonamid-formaldehyde resin by an improved process can be used as above stated in cellulose derivative lacquers or plastic compositions.

In accordance with our invention, we prepare special synthetic resins formed by the condensation of toluene sulfonamid and formaldehyde. These synthetic resins are then used for making a lacquer or a plastic composition, which contains one or more derivatives of cellulose and a volatile solvent. The lacquer may also contain one or more natural or semi-synthetic resins or gums, one or more plastifiers or softening agents, medium and/or high boiling point solvent and preferably but not necessarily some pigments and/or dyes.

The solutions thus formed may be employed as lacquer or coating compositions for metal, glass or other surfaces and may be used for making photographic or other films.

Artificial yarns may be formed by extruding the solutions containing the special resin and a derivative of cellulose through the orifices of a spinnerette, either into a heated evaporative atmosphere as in dry spinning, or into a precipitating bath, as in wet spinning. The solution may also be employed as in an adhesive, and is particularly useful in this connection for making shatterless glass by causing celluloid sheets to adhere to surfaces of sheets of glass between which they are placed.

The plastic containing derivatives of cellulose and our resin, may be worked into sheets which may also be used for laminated glass, and also may be worked into blocks or articles in any known manner.

The derivatives of cellulose that may be used for making solutions, coating or plastic compositions, comprises any suitable derivative, such as cellulose nitrate or organic derivatives of cellulose. Examples of organic derivatives of cellulose are: organic esters of cellulose, such as cellulose acetate, cellulose formate, cellulose propionate, or cellulose butyrate and cellulose ethers such as ethyl cellulose, methyl cellulose, or benzyl cellulose.

The low boiling point solvent that may be employed may be one or a mixture of two or more of the following: acetone, alcohol, benzene, or ethylene dichloride. Examples of medium and/or high boiling point solvents are: ethyl acetate, ethyl lactate, tetrachlorethane, benzyl alcohol or diacetone alcohol. Examples of suitable plastifiers are: diphenylol propane, monomethyl xylene sulfonamid, ortho or meta ethyl toluene sulfonamid. If desired, fire retardants may be added, particularly the very effective bromine derivatives of organic compounds, such as brominated tricresyl phosphate.

The pigments or dyes that may be used are any of the ordinary pigments or dyes used in the paint or lacquer industry.

Of the natural gums or resins that may be employed, the following may be mentioned: manila, acaroides, pontianak, kauri dammar, rosin and shellac.

The semi-synthetic resin, ester gum, which is the glycerol ester of rosin, may also be added. Examples of other synthetic resins that may be used in conjunction with our resin, are the fusible and soluble phenol-formaldehyde or diphenylol propane-formaldehyde resins preferably prepared in the presence of acid catalysts, and phenol furfural resins and toluene sulfonamid and furfural resins.

The following is a detailed description of one mode of preparing our resin:

Equimolecular proportions of p-toluene sulfonamid and formaldehyde are heated together under reflux at 100-150° C. for from 16 to 20 hours, preferably in a jacketed vessel having oil or other heating medium in the jacket. Condensation may be caused to take place in the presence of an acid or an alkaline catalyst, but the presence of a catalyst is not necessary. The product thus formed is a soft, yellow resin, which may be washed with water to remove any excess formaldehyde or toluene sulfonamid present, the water is then removed by heating or otherwise. It may be dissolved in solvents such as ether or benzene, by which means the resin may be separated from the unchanged toluene sulfonamid.

The resin is then distilled at ordinary pressure or under vacuum to remove the excess water. It is then heated to 200-260° C., preferably about 245-250° C. for 15 to 30 minutes under reflux. Alternately we may heat the resin at 130-150° C. for from 4 to 20 hours not under reflux, but either open to the air or arranged so that any volatile substances present in the resin may distill away. At the end of this period of heating, the special resin is substantially free from any unconverted toluene sulfonamid, and when cooled, sets to a clear, hard, yellow resin, which is completely soluble in benzene. At the end of this period of drying, the resin is substantially free from formaldehyde, in fact not more than a trace of formaldehyde can be detected in the vapors coming from the resin after about ½ hour's heating at 130-150° C., there is, therefore, no cause to suspect the presence of formaldehyde, nor is there any evidence of reactive methylene groups still present in this compound. However, we have found that this resin is still reactive in the sense that it will combine with further quantities of toluene sulfonamid. We have found that portions of toluene sulfonamid up to 25% of the weight of the resin, can be added to it, and that on fusing at the aforesaid temperatures of 130-150° C., the said toluene sulfonamid is gradually converted into resin.

If a sample is withdrawn from the resin shortly after the addition of the tolene sulfonamid to it, the presence of free tolene sulfonamid is shown by the fact that the sample is not entirely soluble in benzene, and the insoluble material can be identified as free toluene sulfonamid. However, this toluene sulfonamid disappears gradually in the heating, and in from 1 to 4 hours, according to the temperature used, it is entirely converted into resin. The resin on cooling, is clear, and hard and has a melting point of approximately 64 to 75° C. It is entirely soluble in acetone, alcohol, and benzene, and the solutions in benzene do not deposit any free toluene sulfonamid or other crystalline bodies. It is completely compatible in all proportions with cellulose acetate, and films, plastics, threads, lacquers, etc., made from it show no tendency to bloom on the surface.

In another mode of carrying out our invention 5 to 10% of urea as added to the initial reactants, and the subsequent steps are carried out as already described. We have further found that this resin is not permanently fusible in the way in which this term is commonly used in resin literature. If the improved resin, as herein described, is held at a temperature of 160-200° C., preferably about 175° C., for from 4 to 8 hours, it is converted into a dark, greenish brown resin, which consists almost entirely of two crystalline substances, both of which are largely insoluble in benzene. The exact composition and formula of these substances cannot be given. However, one of them, in the crude state in which it separates from the benzene solution, melts at 140-150° C., whilst the second one melts at 160-162° C., and on recrystallizing from alcohol or xylene it melts sharply at 165° C.

It is to be understood that the foregoing detailed description is given merely by way of illustration, and that many variations may be made therein without departing from the spirit of our invention.

Having thus described our invention, what we desire to claim and secure by Letters Patent is:

1. Method of preparing a synthetic resin comprising reacting a toluene sulfonamid-aldehyde resin with an excess of toluene sulfonamid.

2. Method of preparing a synthetic resin comprising reacting a toluene sulfonamid-formaldehyde resin with an excess of toluene sulfonamid.

3. Method of preparing a synthetic resin comprising reacting substantially equimolecular proportions of toluene sulfonamid and an aldehyde, removing excess of reactants, adding a further quantity of toluene sulfonamid to the resin thus formed and causing the same to condense.

4. Method of preparing a synthetic resin comprising reacting substantially equimolecular proportions of toluene sulfonamid and formaldehyde, removing excess of reactants, adding a further quantity of toluene sulfonamid to the resin thus formed and causing the same to condense.

5. Method of preparing a synthetic resin comprising reacting substantially equimolecular proportions of toluene sulfonamid and an aldehyde in the presence of urea, removing excess of reactants, adding a further quantity of toluene sulfonamid to the resin thus formed and causing the same to condense.

6. Method of preparing a synthetic resin comprising reacting substantially equimolecular proportions of toluene sulfonamid and formaldehyde in the presence of urea, removing excess of reactants, adding a further quantity of toluene sulfonamid to the resin thus formed and causing the same to condense.

7. A synthetic resin formed by the reaction of a toluene sulfonamid-aldehyde resin with an excess of toluene sulfonamid.

8. A synthetic resin formed by the reaction of a toluene sulfonamid-formaldehyde resin with an excess of toluene sulfonamid.

9. A synthetic resin formed by the reaction of a toluene sulfonamid-formaldehyde resin with an excess of toluene sulfonamid, said resin being clear and hard and having a melting point between about 64° to 75° C.

In testimony whereof, we have hereunto subscribed our names.

WILLIAM HENRY MOSS.
BLANCHE B. WHITE.